(12) United States Patent  
Schote

(10) Patent No.: US 6,676,298 B2
(45) Date of Patent: Jan. 13, 2004

(54) WHEEL BEARING UNIT

(75) Inventor: Norbert Schote, Ammerbuch (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 28 days.

(21) Appl. No.: 10/066,639

(22) Filed: Feb. 6, 2002

(65) Prior Publication Data

US 2002/0110299 A1 Aug. 15, 2002

(30) Foreign Application Priority Data

Feb. 13, 2001 (DE) .......................................... 201 02 451

(51) Int. Cl.$^7$ ............................................... B60B 27/02
(52) U.S. Cl. .................... 384/477; 301/105.1; 464/178
(58) Field of Search ................. 384/477, 478, 384/480, 481, 484, 485, 486, 488, 544; 464/178; 301/105.1

(56) References Cited

U.S. PATENT DOCUMENTS

| | | | | |
|---|---|---|---|---|
| 4,010,986 A | * | 3/1977 | Otto ............................. | 384/478 |
| 4,241,957 A | * | 12/1980 | Peck ............................ | 384/135 |
| 4,269,459 A | * | 5/1981 | Peck ............................ | 384/135 |
| 5,674,011 A | * | 10/1997 | Hofmann et al. ........... | 384/448 |

FOREIGN PATENT DOCUMENTS

DE            4425732 A1       1/1996

* cited by examiner

Primary Examiner—William C Joyce
(74) Attorney, Agent, or Firm—Crowell & Moring LLP

(57) ABSTRACT

A wheel bearing unit for a motor vehicle has a wheel bearing arranged in a pivot bearing and including a received propeller shaft which, by way of a joint bell, is situated opposite a receiving element of the pivot bearing. Directly opposite areas of the pivot bearing receiving element and the joint bell have reductions in their thicknesses, and a ring gap formed between the receiving element and the joint bell can be bridged by a sealing ring which can be pressed upon the propeller shaft.

10 Claims, 1 Drawing Sheet

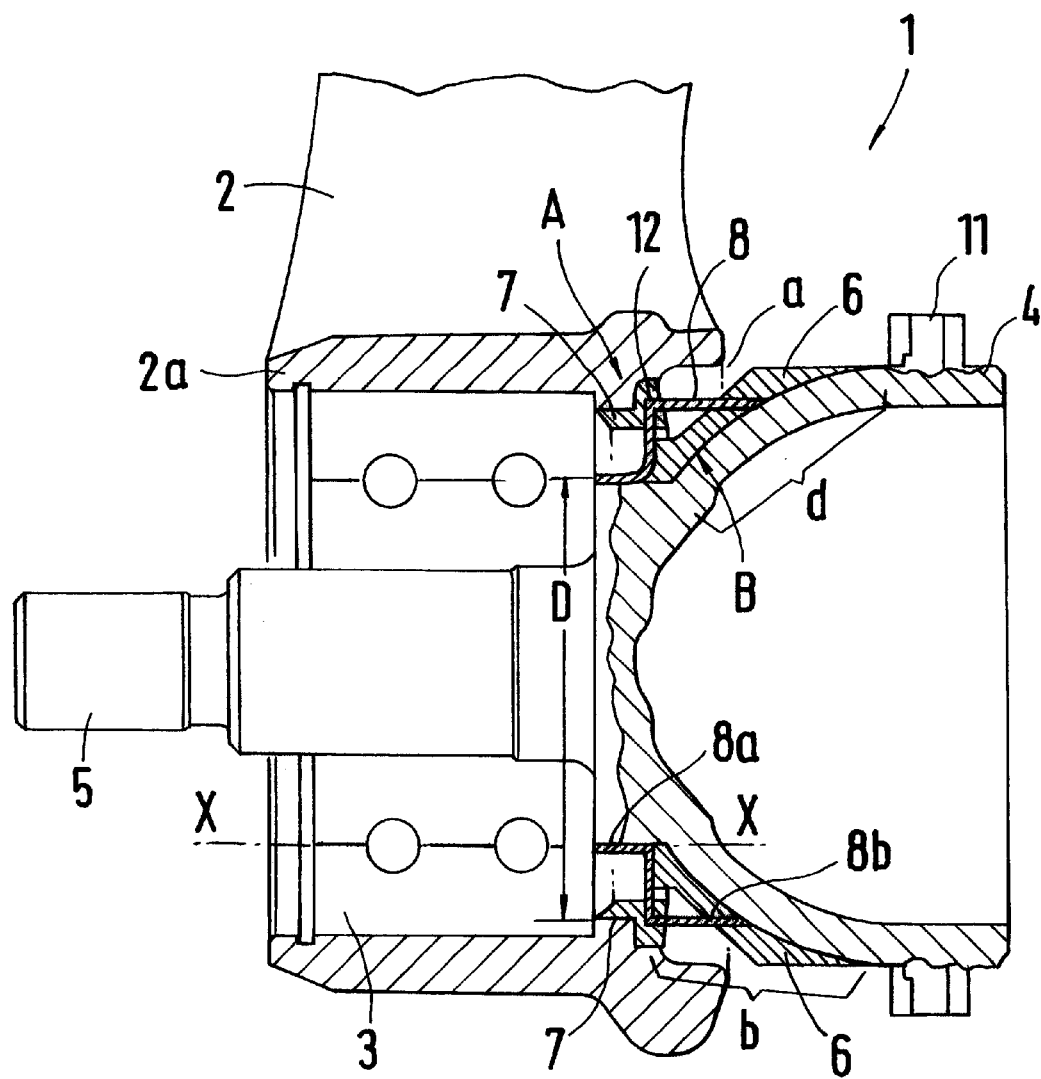

WHEEL BEARING UNIT

This application claims the priority of German application 201 02 451.9, filed Feb. 13, 2001, the disclosure of which is expressly incorporated by reference herein.

BACKGROUND AND SUMMARY OF THE INVENTION

The present invention relates to a wheel bearing unit for a motor vehicle comprising a wheel bearing arranged in a pivot bearing, and a received propeller shaft which, by way of a joint bell, is situated opposite a receiving element of the pivot bearing.

In a wheel bearing unit according to German Patent Document DE 44 25 732 A1, a sealing element is provided between a wheel bearing and a joint bell for sealing off a ring gap. On one side, this sealing element is supported on the bearing and, on the other side, the sealing element is supported on the joint bell.

It is an object of the invention to provide a light weight wheel bearing unit, such as a wheel carrier/pivot bearing and a propeller shaft with a joint bell for a motor vehicle, which ensures optimal sealing between the joint bell and the wheel bearing unit or a drive shaft.

According to the invention, this object is achieved by way of directly opposite areas of the receiving element and of the joint bell having reductions of their thicknesses, and a sealing ring, which can be pressed upon the propeller shaft, by which a forming ring gap between the receiving element and the joint bell can be bridged. Additional advantageous characteristics are reflected in various claims.

A process of ensuring optional sealing in a wheel bearing unit is also claimed.

Principal advantages achieved by the invention include enlarging a conventionally narrow ring gap between a joint bell and a receiving element of a pivot bearing for weight reduction. This takes place by way of the reduction in thickness of the directly opposite areas of the receiving element and of the joint bell, and by bridging the forming ring gap by way of a sealing ring, which can be pressed onto the propeller shaft, or an additional component.

According to the invention, the reduction of weight at the joint bell and at the wheel carrier/pivot bearing can advantageously be achieved, but the ring gap between these two components is enlarged, resulting in the risk of contamination. In order to counteract this, the relatively large ring gap is covered by a sealing ring which has a low weight. On the whole, therefore, the weight of the wheel bearing unit is reduced.

The sealing element or the sealing ring can rotate along on the propeller shaft, be mounted on the propeller shaft, or be arranged on the pivot bearing/wheel carrier without rotating along with the carrier.

Weight reduction is achieved by reducing the thickness of the pivot bearing at the receiving element as well as at the joint bell as a result of removal of material. This reduction of thickness is advantageously taken into account already during the manufacturing of the parts. As a result of the construction and positioning of the joint bell with respect to the pivot bearing, the ring gap achieved cannot be reduced, so that a sealing ring is required. This sealing ring is held by one leg on the propeller shaft, and another leg, at the end of the sealing ring which faces away, rests tightly against the joint bell. The intermediate area of the sealing ring is correspondingly bent and rests by way of a projecting edge against the receiving element of the pivot bearing. This sealing ring may also have a different shape.

Removal of material on the joint bell preferably extends along a circle segment from an attachment or a shackle toggle joint to approximately the jointing plane of the bearing. As a result, material removal can take place over a relatively large area without impairing the stability of the joint bell. Correspondingly, removal of material on the receiving element of the pivot bearing which, on the end side of the receiving element, consists of an enlargement of the inside diameter, is provided. This removal of material also ensures a robust tight fit of the bearing.

BRIEF DESCRIPTION OF THE DRAWING FIGURE

An embodiment of the invention is illustrated in the drawing and will be described. The drawing is a sectional view of a wheel bearing unit including a pivot bearing and a joint bell with a bearing.

DETAILED DESCRIPTION OF THE INVENTION

A wheel bearing unit 1 for a motor vehicle includes a pivot bearing 2 with a wheel bearing 3 and an axle or propeller shaft 5 connected with a joint bell 4.

The joint bell 4 is arranged, at a predetermined distance with respect to the pivot bearing 2 on the basis of the situation, so that only a small gap "a" is formed in order to avoid contamination of the bearing 3.

So that a significant weight reduction can be achieved at the wheel bearing unit 1, according to the invention, a reduction of the thickness takes place by so-called removals 6 and 7 of material in opposite areas A and B, for example, in a possible exterior area "d" of the joint bell 4 and a possible interior area (inside diameter D) at the receiving element 2a of the pivot bearing 2. As a result of these removals of material 6 and 7, the originally small gap "a" between the components 2, 2a and 4 is enlarged to a gap "b" which is closed off by a light-weight sealing ring 8.

The removal 6 of material at the joint bell 4 extends, on the exterior side along a small segment "d" of the circle, from the attachment to the shackle toggle joint 11 to approximately the jointing plane X—X of the bearing 3. The material removal 7 at the pivot bearing 2 is provided at the end side of the bearing receiving device 2a for the bearing 3 and is formed by an enlargement of the inside diameter D.

The sealing ring 8 may be a plastic ring or a sheet metal ring which closely bridges the gap "b". A possible construction is illustrated in the drawing. The sealing ring is, for example, held in a pressed-on manner by way of the leg 8a with the propeller shaft 5. The end 8b facing away rests directly against the joint bell 4. The intermediate area is bent and rests by way of a projecting edge 12 against the receiving element 2a of the pivot bearing 2. The sealing ring may also be pressed onto the pivot bearing/wheel carrier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A wheel bearing unit for a motor vehicle comprising:

a wheel bearing arranged in a pivot bearing, a received propeller shaft which, by way of a joint bell, is situated opposite a receiving element of the pivot bearing, directly opposite areas of the receiving element and of the joint bell having reductions of their thicknesses, and a sealing ring, which is pressed upon the propeller shaft, by which a forming ring gap between the receiving element and the joint bell is bridged, wherein the sealing ring is held by a leg on the propeller shaft and rests by way of another facing-away end against the joint bell, an intermediate area of said sealing ring being bent and having an edge situated closely opposite the receiving element of the pivot bearing.

2. A wheel bearing unit for a motor vehicle comprising:

a wheel bearing arranged in a pivot bearing, a received propeller shaft which, by way of a joint bell, is situated opposite a receiving element of the pivot bearing, directly opposite areas of the receiving element and of the joint bell having reductions of their thicknesses, and a sealing ring, which is pressed upon the propeller shaft, by which a forming ring gap between the receiving element and the joint bell is bridged, wherein the reductions of the thicknesses of the receiving element of the pivot bearing and the joint bell is provided by removal of material, wherein the removal of material on the joint bell extends along an exterior segment of a circle from an attachment to approximately a jointing plane of the wheel bearing, wherein the removal of material on the receiving element of the pivot bearing, on an end side, is provided by an enlargement of an inside diameter of the receiving element, and wherein the sealing ring is held by a leg on the propeller shaft and rests by way of another facing-away end against the joint bell, an intermediate area of said sealing ring being bent and having an edge situated closely opposite the receiving element of the pivot bearing.

3. A wheel bearing unit for a motor vehicle comprising:

a wheel bearing arranged in a pivot bearing, a received propeller shaft which, by way of a joint bell, is situated opposite a receiving element of the pivot bearing, directly opposite areas of the receiving element and of the joint bell having reductions of their thicknesses, and a sealing ring, which is pressed upon the propeller shaft, by which a forming ring gap between the receiving element and the joint bell is bridged, wherein the reductions of the thicknesses of the receiving element of the pivot bearing and the joint bell is provided by removal of material, and wherein the sealing ring is held by a leg on the propeller shaft and rests by way of another facing-away end against the joint bell, an intermediate area of said sealing ring being bent and having an edge situated closely opposite the receiving element of the pivot bearing.

4. The A wheel bearing unit for a motor vehicle comprising:

a wheel bearing arranged in a pivot bearing, a received propeller shaft which, by way of a joint bell, is situated opposite a receiving element of the pivot bearing, directly opposite areas of the receiving element and of the joint bell having reductions of their thicknesses, and a sealing ring, which is pressed upon the propeller shaft, by which a forming ring gap between the receiving element and the joint bell is bridged, wherein the reductions of the thicknesses of the receiving element of the pivot bearing and the joint bell is provided by removal of material, wherein the removal of material on the joint bell extends along an exterior segment of a circle from an attachment to approximately a jointing plane of the wheel bearing, and wherein the sealing ring is held by a leg on the propeller shaft and rests by way of another facing-away end against the joint bell, an intermediate area of said sealing ring being bent and having an edge situated closely opposite the receiving element of the pivot bearing.

5. A wheel bearing unit for a motor vehicle comprising:

a wheel bearing arranged in a pivot bearing, a received propeller shaft which, by way of a joint bell, is situated opposite a receiving element of the pivot bearing, directly opposite areas of the receiving element and of the joint bell having reductions of their thicknesses, and a sealing ring, which is pressed upon the propeller shaft, by which a forming ring gap between the receiving element and the joint bell is bridged, wherein the reductions of the thicknesses of the receiving element of the pivot bearing and the joint bell is provided by removal of material, wherein the removal of material on the receiving element of the pivot bearing, on an end side, is provided by an enlargement of an inside diameter of the receiving element, and wherein the sealing ring is held by a leg on the propeller shaft and rests by way of another facing-away end against the joint bell, an intermediate area of said sealing ring being bent and having an edge situated closely opposite the receiving element of the pivot bearing.

6. A process of ensuring optimal sealing in a wheel bearing unit between a joint bell and a received propeller shaft, the wheel bearing unit having a wheel bearing arranged in a pivot bearing and the received propeller shaft which, by way of the joint bell, is situated opposite a receiving element of the pivot bearing, comprising:

reducing thicknesses of directly opposite areas of the receiving element and of the joint bell, and pressing a sealing ring, which can bridge a forming ring gap between the receiving element and the joint bell, upon the propeller shaft, wherein the sealing ring is held by a leg on the propeller shaft and rests by way of another facing-away end against the joint bell, an intermediate area of said sealing ring being bent and having an edge situated closely opposite the receiving element of the pivot bearing.

7. A process of ensuring optimal sealing in a wheel bearing unit between a joint bell and a received propeller shaft, the wheel bearing unit having a wheel bearing arranged in a pivot bearing and the received propeller shaft which, by way of the joint bell, is situated opposite a receiving element of the pivot bearing, comprising:

reducing thicknesses of directly opposite areas of the receiving element and of the joint bell, and pressing a sealing ring, which can bridge a forming ring gap between the receiving element and the joint bell, upon the propeller shaft, wherein reducing the thicknesses of the receiving element of the pivot bearing and the joint bell is provided by removal of material, wherein the removal of material on the joint bell extends along an exterior segment of a circle from an attachment to approximately a jointing plane of the wheel bearing, wherein the removal of material on the receiving element of the pivot bearing, on an end side, is provided by enlarging an inside diameter of the receiving element, and wherein the sealing ring is held by leg on the propeller shaft and rests by way of another facing-away end against the joint bell, an intermediate area of said sealing ring being bent and having an edge situated closely opposite the receiving element of the pivot bearing.

8. A process of ensuring optimal sealing in a wheel bearing unit between a joint bell and a received propeller shaft, the wheel bearing unit having a wheel bearing arranged in a pivot bearing and the received propeller shaft which, by way of the joint bell, is situated opposite a receiving element of the pivot bearing, comprising:

reducing thicknesses of directly opposite areas of the receiving element and of the joint bell, and pressing a sealing ring, which can bridge a forming ring gap between the receiving element and the joint tell, upon the propeller shaft, wherein reducing the thicknesses of the receiving element of the pivot bearing and the joint bell is provided by removal of material, and wherein the sealing ring is held by a leg on the propeller shaft and rests by way of another facing-away end against the joint bell, an intermediate area of said sealing ring being bent and having an edge situated closely opposite the receiving element of the pivot bearing.

9. A process of ensuring optimal sealing in a wheel bearing unit between a joint bell and a received propeller shaft, the wheel bearing unit having a wheel bearing arranged in a pivot bearing and the received propeller shaft which, by way of the joint bell, is situated opposite a receiving element of the pivot bearing, comprising:

reducing thicknesses of directly opposite areas of the receiving element and of the joint bell, and pressing a sealing ring, which can bridge a forming ring gap between the receiving element and the joint bell, upon the propeller shaft, wherein reducing the thicknesses of the receiving element of the pivot bearing and the joint bell is provided by removal of material, wherein the removal of material on the joint bell extends along an exterior segment of a circle from an attachment to approximately a jointing plane of the wheel bearing, and wherein the sealing ring is held by leg on the propeller shaft and rests by way of another facing-away end against the joint bell, an intermediate area of said sealing ring being bent and having an edge situated closely opposite the receiving element of the pivot bearing.

10. A process of ensuring optimal sealing in a wheel bearing unit between a joint bell and a received propeller shaft, the wheel bearing unit having a wheel bearing arranged in a pivot bearing and the received propeller shaft which, by way of the joint bell, is situated opposite a receiving element of the pivot bearing, comprising:

reducing thicknesses of directly opposite areas of the receiving element and of the joint bell, and pressing a sealing ring, which can bridge a forming ring gap between the receiving element and the joint bell, upon the propeller shaft, wherein reducing the thicknesses of the receiving element of the pivot bearing and the joint bell is provided by removal of material, wherein the removal of material on the receiving element of the pivot bearing, on an end side, is provided by enlarging an inside diameter of the receiving element, and wherein the sealing ring is held by a leg on the propeller shaft and rests by way of another facing-away end against the joint bell, an intermediate area of said sealing ring being bent and having an edge situated closely opposite the receiving element of the pivot bearing.

* * * * *